United States Patent [15] 3,674,305
Steury [45] July 4, 1972

[54] CAMPER TYPE VEHICLE AND DRIVE ASSEMBLY FOR RAISING THE TOP THEREOF

[72] Inventor: Virgil H. Steury, 924 E. Lincoln Ave., Goshen, Ind. 46526

[22] Filed: Aug. 13, 1970

[21] Appl. No.: 63,420

[52] U.S. Cl. ................................................296/27, 52/66
[51] Int. Cl. ...........................................................B60p 3/34
[58] Field of Search ..............................296/23, 26, 27; 52/66

[56] References Cited

UNITED STATES PATENTS 3,495,866  2/1970  Bontrager ..................................296/27
3,508,782  4/1970  Hostetler ...................................296/27

Primary Examiner—Philip Goodman
Attorney—Olson, Trexler, Wolters & Bushnell

[57] ABSTRACT

A mobile type housing such as a trailer or camper having a base and retractable top is disclosed herein. The housing includes a plurality of telescopically movable support members mounted to the base and supporting the top for movement between a retracted or lowered position while in transit and an extended or raised position while in use. A single drive assembly is mounted to the base and connected to all of the support members through a plurality of elongated flexible pushrods for moving the support members equal distances and in unison so as to raise the top in a smooth, even and reliable manner.

14 Claims, 9 Drawing Figures

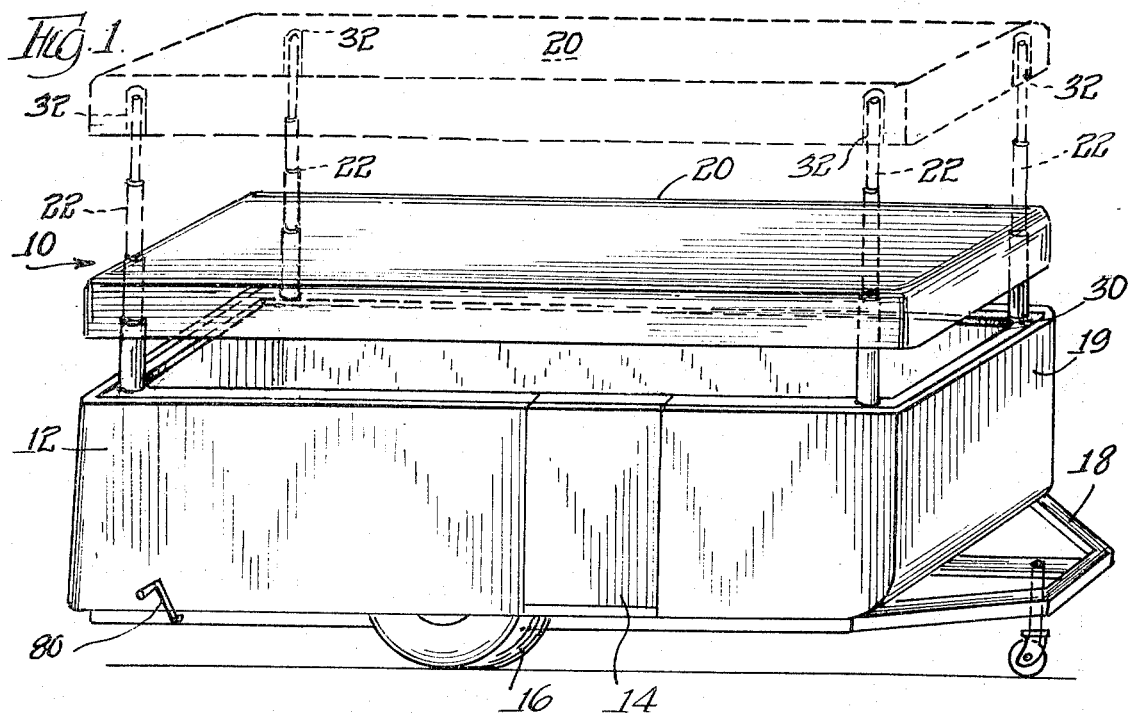
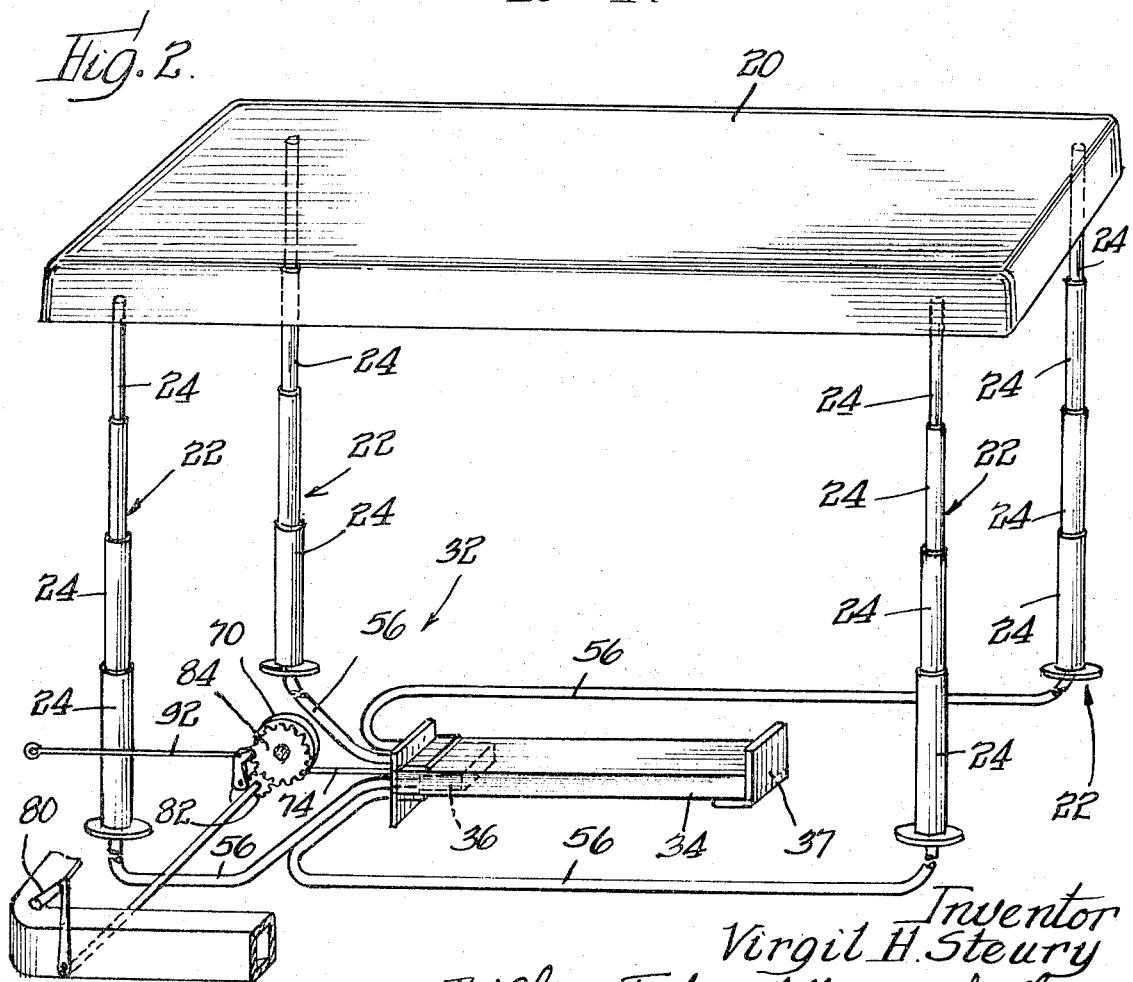

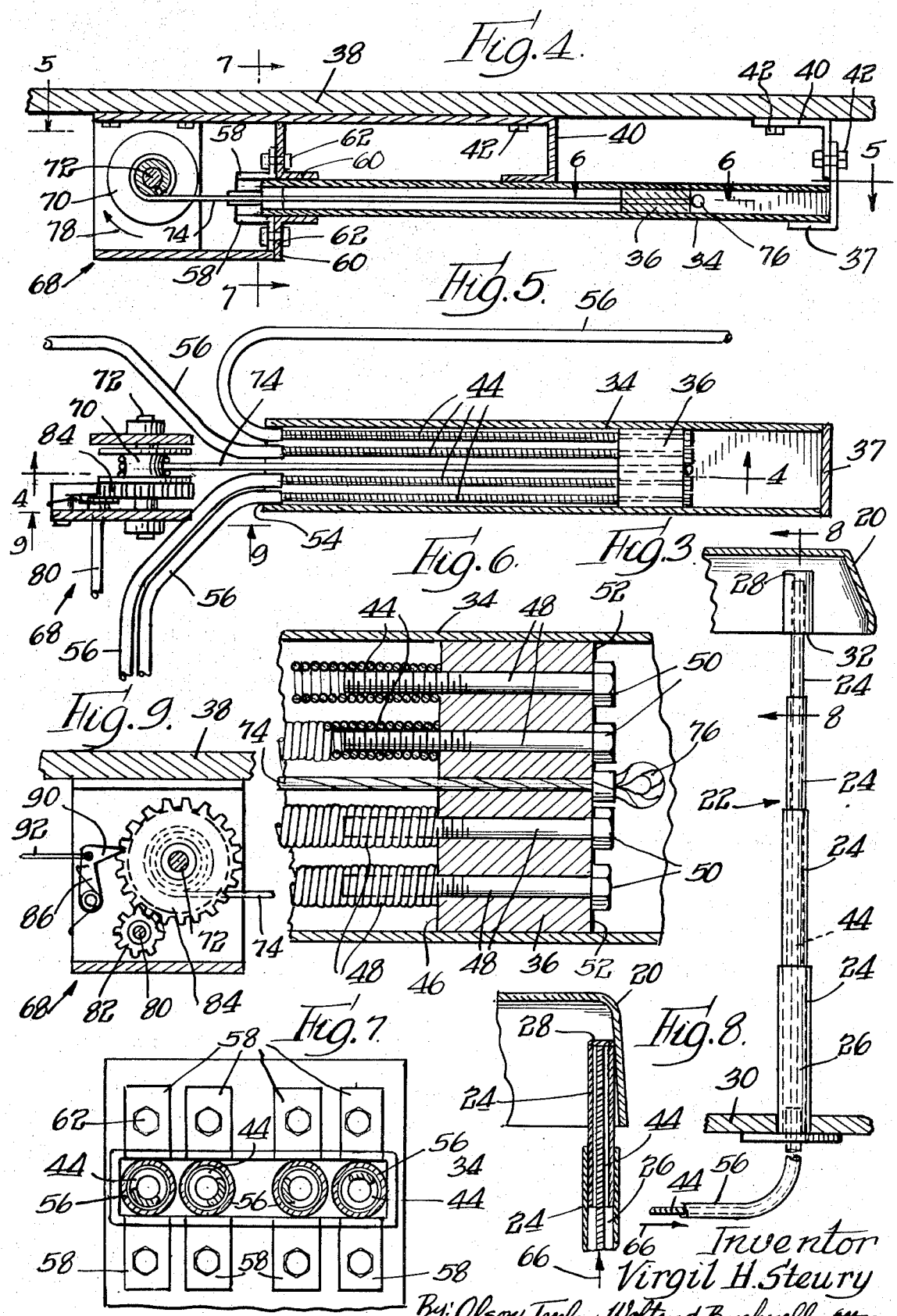

CAMPER TYPE VEHICLE AND DRIVE ASSEMBLY FOR RAISING THE TOP THEREOF

SUMMARY OF THE INVENTION

This invention relates generally to mobile housings such as trailers and campers and more particularly to mobile housings displaying retractable tops and drive assemblies for the raising and lowering thereof.

DISTINCTION OVER THE PRIOR ART AND OBJECTS

Campers, trailers, or other mobile housings of the type displaying retractable tops are generally known and include, for the most part, a plurality of elongated axially movable corner-posts or supports mounted to the housing's base and supporting the top thereof for movement between a retracted or lowered position and an extended or raised position. Typically, this type of vehicular housing relies on individual actuators or drive assemblies for axially moving each corner-post to an extended position so as to thereby raise the top relative to the base. This method of utilizing separate actuating means for each corner-post or support not only adds to the complexity of the entire vehicle but lends to further disadvantages. For example, it has been found that,after continued use and wearing of the components, the actuating mechanisms tend to become unsynchronized with respect to each other, thereby causing the top to raise in a further uneven manner which, as is readily apparent, allows for the possibility of jamming or sticking, so that the top never reaches its maximum height. In addition, once the top is jammed in a raised position, it becomes quite difficult to move it to its lowered position.

Accordingly, a general object of the present invention is to provide a new and improved drive assembly for raising the top of a mobile type housing such as a camper or trailer, which drive assembly is economical to manufacture and relatively simple in design.

Another object of the present invention is to provide a new and improved drive assembly which raises the top of a retractable type camper or trailer in a more reliable manner than those of the prior art.

A more specific object of the present invention is to provide a mobile type housing such as a trailer or camper which utilizes a plurality of telescopically movable corner posts or supports for raising the housing's top relative to its base, and a new and improved drive assembly for telescopically moving the corner posts or supports in unison and the same distance for thereby more evenly and reliably raising the top.

Still another object of the present invention is to provide a new and improved drive assembly of the above-stated type which displays a single actuating mechanism for moving the aforementioned corner-posts or supports whereby to guarantee unison movement thereof.

Still another object of the present invention is to provide a drive assembly of the above-stated type which more reliably moves the plurality of aforementioned corner-posts or supports equal distances for more accurately, evenly positioning the housing's top relative to its base.

These and other objects and features of this invention will become more apparent from a reading of the following descriptions.

The aforementioned objects are achieved and the prior art deficiencies eliminated by the utilization of a novel drive assembly for raising the top of a mobile type housing such as a trailer or camper having a plurality of axially and telescopically movable elongated corner-posts or support members mounted to the housing's base and supporting the housing's top for movement between a lowered or retracted position when the trailer is in transit and an extended or raised position when the trailer is in use.

The drive assembly, in accordance with the present invention, includes a master tube in the form of an elongated housing which supports a propulsion block in the form of a lug for movement between a rearward position when the top is down and a forward position when the top is up. A plurality of flexible but axially non-compressible and non-stretchable push-rods (one for each of the aforesaid corner-posts or support members) are rigidly connected at common ends to the propulsion block and extend into the telescopic corner-posts or support members where they terminate thereat.

Each of the push-rods is guided to its respective corner-post through a rigid guide tube or conduit which, in addition, restricts the push-rod to axial movement as opposed to buckling or flexing type movement. In this manner, as the propulsion block is moved from its rearward to forward position, which movement is provided by a winch assembly, the push-rods move axially forwardly into their respective corner-posts, causing the latter to telescope upwardly so as to thereby cause the housing's top to move from its retracted or lowered position to its extended or raised position. Since the various push-rods move equal distances (equal to that of the propulsion block), and since they are driven in unison, the top moves in a reliably uniform and level manner, so as to prevent jamming or sticking thereof. In addition, since all of the push-rods and therefore corner-posts are driven by a single assembly, many gear arrangements are eliminated, which in turn minimizes the complexity of the assembly.

BRIEF DESCRIPTION OF THE DRAWINGS:

In the Drawings:

FIG. 1 is a perspective view of a mobile type housing constructed in accordance with the present invention, the housing displaying a retractable top as shown in both solid and dotted lines;

FIG. 2 is a diagrammatic perspective view of the drive assembly used for raising and lowering the top of the housing;

FIG. 3 is a side elevational view of one corner-post provided for movably supporting the top of the housing;

FIG. 4 is a side sectional view of the aforementioned drive assembly, taken generally along the line 4—4 in FIG. 5;

FIG. 5 is a top sectional view of the drive assembly taken generally along line 5—5 in FIG. 4;

FIG. 6 is an enlarged sectional view taken generally along line 6—6 in FIG. 4;

FIG. 7 is an enlarged sectional view taken generally along line 7—7 in FIG. 4;

FIG. 8 is a vertical sectional view, taken generally along line 8—8 in FIG. 3; and FIG. 9 is a side sectional view taken generally along line 9—9 in FIG. 5.

DETAILED DESCRIPTION

Turning now to the drawings wherein like components are designated by like reference numerals throughout the various figures, a mobile housing or trailer, constructed in accordance with the present invention, is illustrated in FIG. 1 and generally designated by the reference numeral 10. The trailer includes a body or base 12 having a door 14 for entry therein and is supported for transportation on a pair of laterally spaced wheels 16. A typical trailer hitch assembly 18 extending from the front end 19 of body or base 12 is provided for connecting the trailer to an automobile or other such vehicle (not shown) for transport thereof. The trailer 10 further includes a substantially rectangular top 20 supported by four elongated telescopically and axially movable hollow corner-posts or support members 22 for movement between a retracted or lowered position relative to base 12, as illustrated by solid lines in FIG. 1, and an extended or raised position, as illustrated by dotted lines.

As illustrated in FIG. 3, each of the corner-posts or support members 22 includes a plurality of concentric telescopic sections 24 which define an axial passageway 26 extending through the entire corner-post and terminating at the top closed end 28 of the innermost concentric telescopic section. Each corner-post is mounted to and through a top, inwardly protruding peripheral edge 30 of body or base 12, at a corner thereof, and extends vertically upwardly into a cooperating slot 32 provided in top 20. In this manner, as the corner-posts or support members are driven from their telescopically retracted positions to their extended positions, top 20 is driven from its retracted or lowered position to its extended or raised position. While four corner-posts are shown, it is to be understood that the invention herein disclosed and claimed contemplates any number of such corner-posts, depending upon the size and shape of trailer 10.

In order to move corner-posts 22 from their retracted to extended positions and therefore raise top 20, a central unitary drive assembly 32, constructed in accordance with the present invention and illustrated generally in FIG. 2, is provided. Drive assembly 32 includes a master tube or guide 34 in the form of an elongated rectangular housing which, as illustrated in FIGS. 4 through 6, houses a propulsion block 36 in the form of a substantially rectangular lug dimensioned so as to snugly but easily slidably move within the master tube. The propulsion block is slidably movable between a rearward or retracted position adjacent the back end of master tube 34, as illustrated best in FIG. 5, and a forward or advanced position adjacent the front end of the master tube, as illustrated best in FIG. 3. A plate 37, closing the back end of tube 34 limits the rearward movement of propulsion block 36, while forward movement is limited in a manner to become apparent below.

As seen in FIG. 4, the master tube 34 is supported, externally, to the floor 38 of base 12 by a plurality of variously shaped angle irons 40 and securing bolts 42, welded or otherwise affixed to the tube, so that the master tube extends longitudinally and substantially parallel with and laterally spaced slightly below floor 38. The master tube or guide, of course, may be positioned transverse of the floor or in any other position relative thereto, depending upon the size and shape of the trailer. It should be understood that the invention herein disclosed and claimed is not limited to a rectangularly shaped master tube and propulsion block, but rather contemplates any reasonable shape thereof, so long as proper operation is maintained.

Turning briefly to FIG. 6, four equally laterally spaced flexible push-rods 44 are mounted at common ends to the front face 46 of propulsion block 36, in a manner to be described below. As illustrated, the push-rods are in the form of highly convoluted or coiled spring members which for reasons to be made apparent below exhibit substantially no compression or expansion in the axial direction which is otherwise typical of springs displaying a lesser number of convolutions per unit length. Each of the push-rods is rigidly mounted to the face 46 of propulsion block 36 by a corresponding threaded bolt 48 which is headed at one end 50, and which extends from the rearward face 52 of the propulsion block through a cooperating channel in the latter, and thereafter extends a substantial distance beyond front face 46 where it may be rigidly threaded within an associated push-rod. This is made possible because the cross-sectional diameter of the threaded portion of bolt 48 is slightly greater than the inner cross-sectional diameter of push-rod 44, and the threads on the former display the same pitch and spacing as the convolutions of the latter.

It should be understood, of course, that the invention herein disclosed and claimed is not limited to the spring-type push-rod as illustrated, but may take on any form so long as it performs the operation to be described below. In addition, the push-rods may be rigidly mounted to the propulsion block by welding or any other suitable methods.

The push-rods 44 extend out the open end 54 of master tube 34 where they each pass through an associated rigid guide tube or conduit 56 which is positioned in confronting relationship with the open end 54 of the master tube by diametrically aligned angle irons 58. As illustrated in FIG. 4 and FIG. 7, one leg of each of the angle irons 58 is welded or otherwise suitably fastened to the external surface of a corresponding guide tube, while the other leg thereof is held to one leg of a similar angle iron 60 by a bolt 62, the other leg of angle iron 60 being welded or otherwise suitably secured to the exterior of master tube 34. In this manner, the guide tubes limit the forward movement of propulsion block 36 to a point adjacent front open end 54 of master tube 34.

Turning to FIG. 2, each of the guide tubes or conduits 56 is shown extending from the front open end of master tube 34 to an associated corner-post or support member 22, where it terminates a slight distance within the passageway 26 defined by the various telescopic sections 24 (FIG. 3). In this manner, each of the push-rods 44 is guided through an associated conduit and into the passageway 26, where it terminates in engagement with the top closed end 28 of the innermost telescopic section 24, as illustrated best in FIG. 8. The individual guide tubes or conduits 56 may take any convenient route or path to their associated corner-posts. It should be noted, that in addition to providing guide means for the push-rods, the guide tubes or conduits restrict the push-rods to axial movement as opposed to buckling or flexing type movement.

From FIG. 3 and FIG. 8, it is readily apparent that by axially moving the push-rod in the direction indicated by arrow 66, as shown in FIGS. 3 and 5, the forward or corner-post entering end of the push-rod engages against the top end 28 of the innermost telescopic section 24, causing the corner-post to move from its retracted or lowered position to an extended or raised position. It is likewise apparent that by axially moving all four push-rods in unison, all four corner-posts will simultaneously raise to their extended position, causing the top 20 of the trailer or camper 10 to move from its retracted or lowered position to its extended or raised position.

In order to achieve the aforementioned simultaneous axial movement of all four push-rods, a winch assembly 68 is provided for moving propulsion block 36 from its rearward position, as seen best in FIG. 5, to its forward position, as seen in FIG. 2. This causes the push-rods, which as stated above are rigidly connected to the propulsion block, to move through their respective guide tubes a distance equal to the movement of the propulsion block. Since the guide tubes 56 prevent buckling or flexing of the push-rod, this movement relationship is reliably maintained. In this regard, it should be noted that the master tube 34 is a sufficiently compact unit so as to additionally prevent such buckling or flexing of the push-rods therein. In addition, since the master tube is straight, and since the push-rods shift or move axially in a straight direction therein, buckling or flexing is substantially eliminated.

Turning to FIG. 9 in conjunction with FIGS. 4 through 6, winch assembly 68 is shown to include a take-up reel 70 rigidly mounted around a rotatably mounted central shaft 72. A take-up cord or rope 74 is fastened at one end to take-up reel 70 and extends through the open end 54 of master tube 34 and into the master tube, where it further extends through a cooperating opening in the front face 46 of propulsion block 36 and terminates beyond the back surface 52 thereof. As noted in FIG. 6, the otherwise free end of take-up cord or rope 74 is provided with a knot 76, or other suitable means, for rigidly fastening the take-up cord and propulsion block together. In this manner, upon driving the take-up reel 70 about shaft 72 in the direction indicated by arrow 78, the take-up cord 74 is wound around the take-up reel, which in turn causes the propulsion block to move from its rearward position to its forward position. As illustrated, the take-up reel is driven manually by a crank 80 which drives a reducing gear 82. The reducing gear, in turn, drives a cooperating sprocket or ratchet 84 positioned adjacent take-up reel 70 and rigidly held about shaft 72 for imparting its rotary motion thereto.

It should be noted, that the top 20 of trailer 10 is sufficiently heavy such that its weight alone is capable of driving the corner posts 22 from their extended positions to their retracted positions when the top is in its raised position. This, of course, causes the push-rods to move back into master tube 34, causing the propulsion block 36 to move back to its rearward position therein. In order to prevent this from occurring and therefore lock top 20 in its raised position, propulsion block 36 is locked in its forward position. This is achieved by the utilization of a pawl 86 which is spring mounted to the base 88 of winch assembly 68, and which includes a projecting cam surface 90 cooperating with the sprocket 84 for preventing the sprocket, and therefore the take-up reel 70, from rotating in a direction opposite to that of arrow 78, while simultaneously allowing the sprocket and therefore the take-up reel to move with the arrow. In this manner, propulsion block 36 may be fixed in its forward position, which in turn prohibits axial movement of push-rods 44 for thereby preventing the weight of top 20 from driving the corner-posts 22 from their extended to retracted positions.

As illustrated in FIG. 9, the pawl 86 is biased in its engaged position so that positive disengagement thereof is necessary for freeing sprocket 84, the therefore take-up reel 70, which in turn allows the top 20 to gravitationally move from its raised position to its lowered position. A rope or other type of pawl release 92 is connected to the pawl for achieving this end. In this regard, it should be noted, that a spring or other suitable means (not shown) may be provided for biasing the propulsion block in its rearward position whereby to aid in lowering the top 20 when pawl 86 is disengaged from sprocket 84. It should also be noted that the pawl release 90 and crank 80 are sufficiently spaced away from each other so that the rotation of the crank, due to the release of the pawl, does not injure or otherwise interfere with the operator.

With trailer or camper 10 constructed in the aforementioned manner, attention is now directed to the manner in which top 20 is raised from its initial retracted or lowered position. This is achieved by driving take-up reel in the direction of arrow 78, which causes the propulsion block 36 to move from its rearward position to its forward position, which simultaneously causes all four push-rods to axially move in unison equal distances through their associated guide tubes 56, for thereby driving the corner-posts 22 from their retracted positions to their extended positions. Because the push-rods are axially driven equal distances, the four corner-posts are maintained level with respect to each other, which thereby guarantees that top 20 remains level. Once top 20 is in its raised position it may be held thereat by means of pawl 86 and sprocket 84. Lowering operation is accomplished merely by disengaging the pawl from the sprocket which frees propulsion block 36 in the aforementioned manner and thereby allows the top to gravitationally move back to its retracted position.

While a preferred embodiment of the invention has been shown, it should be understood, of course, that the invention is not limited thereto, since many modifications may be made. It is, therefore, contemplated to cover by the present application any such modifications as fall within the true spirit and scope of the appended claims.

The invention is claimed as follows:

1. A drive assembly for raising the top of a housing relative to the base thereof, said assembly comprising: a plurality of elongated support members mountable to the base of said housing and telescopically movable between retracted and extended positions, said support members supporting the top of said housing; a lug member mountable to the base of said housing for movement between a rearward position and a forward position; a plurality of flexible elongated connector elements each of which is directly connected at one end to said lug member and engageable at an opposite end with a corresponding elongated support member for moving said support member from its retracted position to its extended position in response to the movement of said lug from said rearward position to said forward position; a like plurality of rigid elongated tubes each of which is mounted to said base and receives therethrough a portion of a corresponding connector element for restricting the connector element to axial movement whereby to prevent buckling thereof; and a winch assembly mountable to said base and connected to said lug for moving said lug from said retracted position to said extended position for thereby moving said top from said lowered position to said raised position, said winch assembly including locking means for maintaining said top in said raised position.

2. A mobile type housing comprising: a base portion; a top portion; a plurality of telescopic movable support means mounted to said base portion for supporting said top portion between a lowered position and a raised position relative to said base; a lug mounted to said base portion for movement between a first position and a second position; a like plurality of flexible elongated incompressible connector elements, each of which is directly connected at one end to said lug and at the other end to said support means at the innermost part thereof for moving said top portion from said lowered position to said raised position in response to the movement of said lug from said first position to said second position; and means for moving said lug from said first position to said second position.

3. A mobile type housing according to claim 2 wherein said connector elements are axially movable along with said lug, the assembly further including means for restricting the connector elements to axial movement whereby to prevent buckling thereof.

4. A mobile type housing according to claim 3 wherein said last mentioned means includes a like plurality of rigid elongated tubes, each of which is mounted to said base and receives therethrough a portion of a corresponding connector element.

5. A mobile type housing according to claim 2 wherein said means for moving said lug includes a winch assembly mountable to said base and connected to said lug for moving said lug from said first position to said second position, said winch assembly including locking means for maintaining the top in said raised position.

6. A mobile type housing according to claim 5 wherein said winch assembly includes handle means for actuating said winch assembly and means for unlocking said winch assembly whereby to allow said top to move to its lowered position, said handle means being positioned a substantial distance from said means for unlocking said winch assembly whereby not to interfere with the operation of said last-mentioned means.

7. A drive assembly for a mobile type housing having a base and a movable top, said assembly comprising: a plurality of support members mounted to said base for movement between retracted positions and extended position, said members supporting said top for movement between a lowered position when said members are in their retracted positions and a raised position when said members are in their extended positions; and a single drive means mountable to said base and engageable with said support members for moving said support members to said extended positions in unison whereby to raise said top, said single drive means including an actuator member mounted for movement between a retracted position and an advanced position, a plurality of conduits respectively extending from said actuator member to said support members, and substantially axially incompressible and axially shiftable elongated elements extending through said conduits between said actuator member and said support members for simultaneously and equally raising all of said support members from movement of the actuator member towards its advanced position.

8. An assembly according to claim 7 including an actuator guide for said actuator member, said conduits being connected to said guide, and wherein said elongated elements are flexible members and wherein said guide is a straight member for resisting buckling of portions of said elongated elements extending beyond said conduits when said actuator member is in its retracted position.

9. A drive assembly for raising the top of a mobile type housing relative to the base thereof, said assembly comprising: a lug mountable to the base of said housing for movement between a retracted position and an advanced position; a plurality of flexible elongated incompressible connector elements, each of which is directly connected at one end to said lug and operatively connected at an opposite end to the top of said housing for moving said top from a lowered position to a raised position in response to the movement of said lug from said rearward position to said forward position; and means for moving said lug from said retracted position to said advanced position for thereby moving said top from said lowered position to said raised position.

10. A drive assembly according to claim 9 including tube means for supporting said lug for movement between said rearward and forward positions.

11. A drive assembly according to claim 9 wherein said connector elements are axially movable along with said lug and wherein said assembly further includes means for restricting the connector elements to axial movement whereby to prevent buckling thereof.

12. A drive assembly according to claim 11 wherein said last mentioned means includes an equal plurality of rigid elongated tubes, each of which receives therethrough an individual connector element for restricting said connector elements to axial movement whereby to prevent buckling and flexing thereof.

13. A drive assembly according to claim 9 including an equal plurality of elongated support members respectively connected to said opposite ends of said connector elements and telescopically movable from a retracted position to an extended position in response to the movement of said lug from said rearward position to said forward position, said support members being engageable with the top of said housing for moving said top from its lowered position to its raised position in response to the movement of said support members from their retracted positions to their extended positions.

14. A drive assembly according to claim 9 wherein said means for moving said lug member includes a winch assembly mountable to said base and connected to said lug member for moving said lug from its rearward position to its forward position, said winch assembly including locking means for maintaining said lug in its forward position whereby to maintain said top in said raised position.

* * * * *